April 16, 1968 J. S. PILCH 3,378,085
HITCH FOR HYDRAULICALLY OPERABLE EXCAVATING APPARATUS
Filed May 25, 1966 3 Sheets-Sheet 1

INVENTOR.
JOHN S. PILCH
BY
Dike, Thompson, & Bronstein
ATTORNEYS

INVENTOR.
JOHN S. PILCH
BY
*Dike, Thompson & Bronstein*
ATTORNEYS

INVENTOR.
JOHN S. PILCH

United States Patent Office 3,378,085
Patented Apr. 16, 1968

3,378,085
HITCH FOR HYDRAULICALLY OPERABLE
EXCAVATING APPARATUS
John S. Pilch, Ware, Mass., assignor to Ware Machine Works, Inc., Ware, Mass., a corporation of Massachusetts
Filed May 25, 1966, Ser. No. 552,909
10 Claims. (Cl. 172—272)

ABSTRACT OF THE DISCLOSURE

A hitch for hydraulically operable excavating apparatus having a rigid hitch tongue and two pairs of connecting members with coaxial bores, each pair adapted to receive between them a tractor lug having a transverse bore for registration with one of said coaxial bores. The hitch tongue extends outwardly centrally of the excavating apparatus and has a groove near its end adapted to receive a connecting rod mounted beneath a tractor. The first pair of connecting members is located laterally and rearwardly at one side of the tongue and the second pair laterally and rearwardly at the opposite side of the tongue so that a three point hitch is provided.

---

This invention relates to hydraulically operable excavating apparatus and more particularly to a hitch for use in attaching the excavating apparatus to and detaching it from a tractor.

It has been the practice for many years to detachably secure a hydraulically operable digging or excavating apparatus at one end of a tractor. The excavating apparatus frequently comprises a bucket held at the end of a boom and dipper stick system and has stabilizing legs arranged generally in the manner shown in FIGURE 1 of U.S. Patent 3,003,651 dated Oct. 10, 1961.

Because the tractor is sometimes used without the excavating apparatus it is important that the hitch be so constructed that the excavating apparatus may be attached to and detached from the tractor quickly and easily and preferably by one man. It is also desirable that the hitch elements be such as to minimize the space required for them between the adjacent ends of the tractor and the excavating apparatus so that the combined length of the tractor and excavating apparatus will be as short as possible. Furthermore it is desirable that the hitch be so constructed and arranged that it will withstand and resist upward and downward forces exerted by the bucket and dipper stick system during excavating operations.

Prior to this invention the most commonly used excavating apparatus hitch was a four point hitch of the type disclosed in U.S. Patent 3,003,651 wherein there are a first two points of attachment at opposite sides of and near the bottom of the tractor end of the excavating apparatus and a second two points of attachment vertically above the first two points. Each of the first two attachment points consists of a downwardly facing groove having its side walls substantially vertical. In use of such four point hitches it is difficult and time consuming to lift and tilt the excavating apparatus to cause the holes in the bores of the lugs of the tractor to register with the bores which form the upper two attachment points of the excavating apparatus so that attachment pins may be inserted during the attachment operation. Tilting during detachment is also difficult.

While a three point hitch has been suggested for use in attaching to a tractor plows, harrows, cultivators and the like, they embody the use of movable attachment points they are expensive to make, install and maintain and they are unsatisfactory for use with hydraulically operated excavating apparatus.

One object of this invention is to provide a tractor hitch for hydraulically operated excavating apparatus which is easy to attach and detach and which overcomes many of the difficulties found in presently known hitches.

A further object is to provide such a hitch which permits the excavating apparatus to be located near the end of the tractor to which it is attached whereby the overall length of the tractor and excavating apparatus is maintained at a minimum.

A still further object is to provide such a hitch which is economical to manufacture and which does not involve moving parts and therefore is easy to maintain, to install and to operate.

Other objects and advantages of the invention will be apparent to persons skilled in the art from the following description taken in conjunction with the accompanying drawings.

In accomplishing the foregoing and related objects the invention provides a rigid hitch tongue extending outwardly centrally at one end of the hydraulically operable excavating apparatus, at least one groove near the end thereof formed by an arcuate end wall and spaced downwardly inclined top and bottom walls, and two pairs of rigid connecting members, the first pair being located laterally of one side of said tongue and the second pair being located laterally of the opposite side of said tongue, the walls of each pair of connecting members having coaxial transverse bores extending therethrough and the axes of said bores being located rearwardly of the end wall of said groove and at a higher elevation than the top wall of said groove, the groove being adapted to receive a connecting rod mounted beneath a tractor and the pairs of connecting members being adapted to receive between them tractor lugs having transverse bores for registration with said transverse bores of the connecting member walls.

For one embodiment of the invention the top and bottom walls of the groove are substantially parallel to a plane which extends through the axes of said transverse bores of the connecting members and the center of the end wall of the groove.

For another embodiment at least one connecting member of each pair of connecting members comprises a memb r extending laterally towards the other connecting member of that pair and the laterally extending member has on its lower surface an upwardly arcuate portion adapted to receive the arcuate portion of a laterally projecting member located on a tractor lug positioned between said connecting member walls.

Other aspects and features of the invention will become apparent upon consideration of the following description and the accompanying drawings in which.

Figure 1:
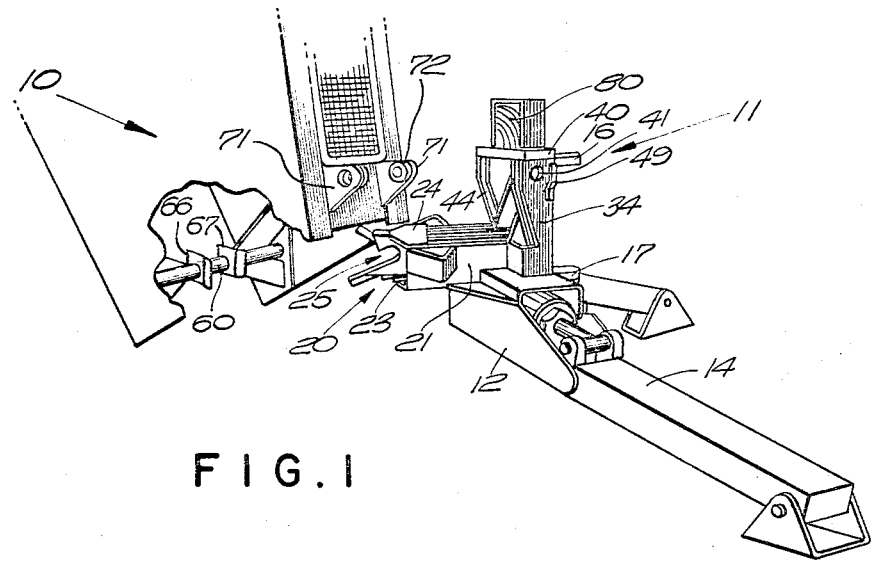
FIG. 1 is a perspective view of part of the end of a tractor and part of an excavating apparatus embodying this invention with the hitch elements in detached condition.
Figure 2:
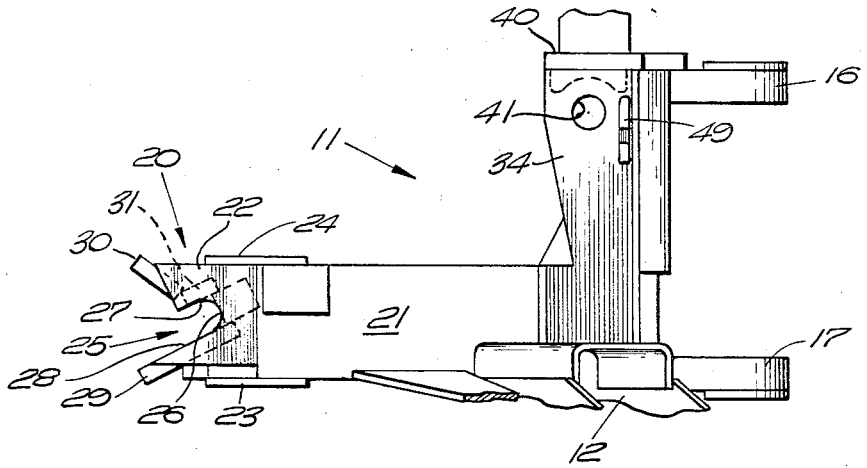
FIG. 2 is an enlarged view in side elevation of the hitch elements of the excavating apparatus of FIG. 1 with parts broken away.

In the drawings the numeral 10 indicates certain elements at one end of a tractor and the numeral 11 indicates certain elements at one end of a hydraulically operable excavating apparatus.

In FIG. 1 the rear end of the tractor and the adjacent end of the excavating apparatus are shown with the hitch elements in detached positions.

Referring to FIGS. 1 to 4, the excavating apparatus includes a pair of rearwardly extending stabilizing leg mounting members 12. The stabilizing legs 14 (FIG. 1) are pivotally secured to the members 12 and they may be actuated to tilt the excavating apparatus relative to the ground by double acting pistons in the cylinders 15 which contain fluid and which are operated by means which are well known in the art.

The boom, dipper stick and bucket and the hydraulic means for operating them are not shown in the drawings because they are well known in the art. The boom and dipper stick are mounted upon the turret ears 16 and 17 by means which are well known in the art.

A rigid hitch tongue 20 extends outwardly of the excavating apparatus centrally of one end thereof and it is formed by parallel plate members 22 and 22'. In the embodiment shown the members 22, 22' are supported by the outer side members 21 and cross plates 23 and 24.

Each of the members 22 is provided with a groove 25 near its end, said groove being formed by an arcuate end wall 26 (FIG. 2) and substantially parallel, downwardly inclined top and bottom walls 27 and 28. A downwardly inclined bottom guide plate 29 (FIGS. 2 and 4) is welded between the side walls 22 and an upwardly inclined top guide plate 30 is welded between the side walls 22 with its lower end abutting the top filler 31.

Two pairs of rigid vertical connecting member plates 34-35 and 36-37 (FIGS. 3 and 4) are located laterally at opposite sides of the tongue 20 and they extend downwardly from the top plate 40.

Figure 3:
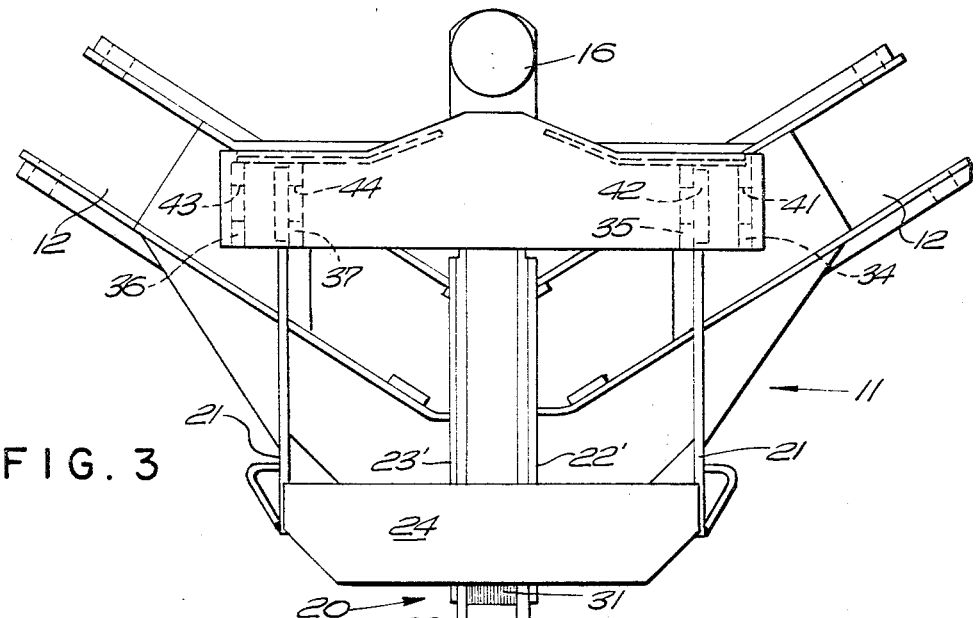
FIG. 3 is a plan view of the apparatus elements shown in FIG. 2.

The connecting member plate 34 is provided with a transverse hole or bore 41 (FIGS. 1 to 4) and the plate 35 is provided with a coaxial bore 42 (FIG. 3). The connecting member plates 36-37 are provided with similar coaxial bores 43, 44 (FIGS. 1 and 3). The axes of these bores are located substantially above and rearwardly from the end walls 26 of the grooves 25 and, as appears from FIG. 2, the top and bottom walls 27, 28 of each groove are substantially parallel to a plane through the axes of the bores and the centers of the end walls of the grooves.

Each of the inner connecting member plates 35, 37 is provided with an inwardly projecting member 46 (FIGS. 4 and 5) the lower surface of which has an upwardly arcuate portion or groove 47.

Each of the outer connecting member plates 34, 35 is provided with a retaining member 49. A pin 50 is adapted to be inserted in the bores 41-42 and to be rotated to a position wherein its arm or handle 51 is positioned between the retaining member 49 and the plate member 34 to detachably hold the pin against removal from the bores. A similar pin 52 and handle 53 is provided for the other pair of connecting member plates 36, 37.

Figure 7:
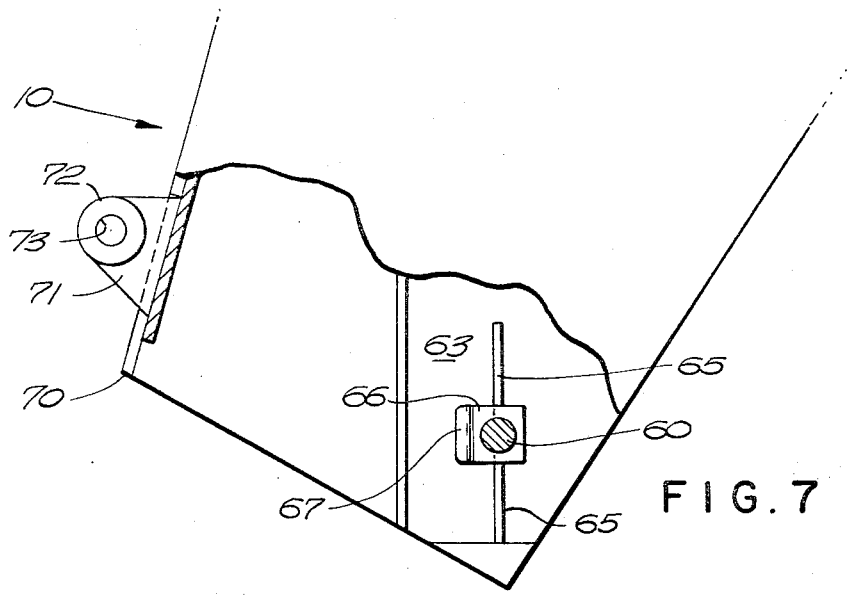
FIG. 7 is a section taken on the line 7—7 of FIG. 6.
Figure 6:
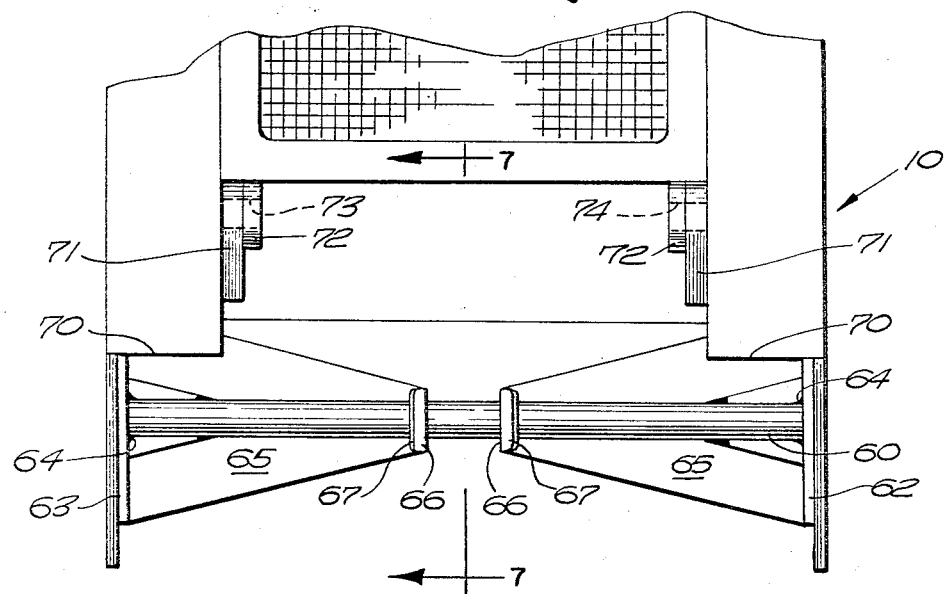
FIG. 6 is an enlarged view in side elevation looking from right to left at the tractor elements shown in FIG. 1.

Referring to FIGS. 1, 6 and 7, the connecting rod 60 is rigidly secured between the frame members 62, 63 by welds 64 and gussets 65. Guide members 66 having outwardly curved lips 67 are secured to the rod 60. It is to be noted that the rod 60 is located a substantial distance inwardly from the outermost corners 70 of the tractor.

Figure 4:
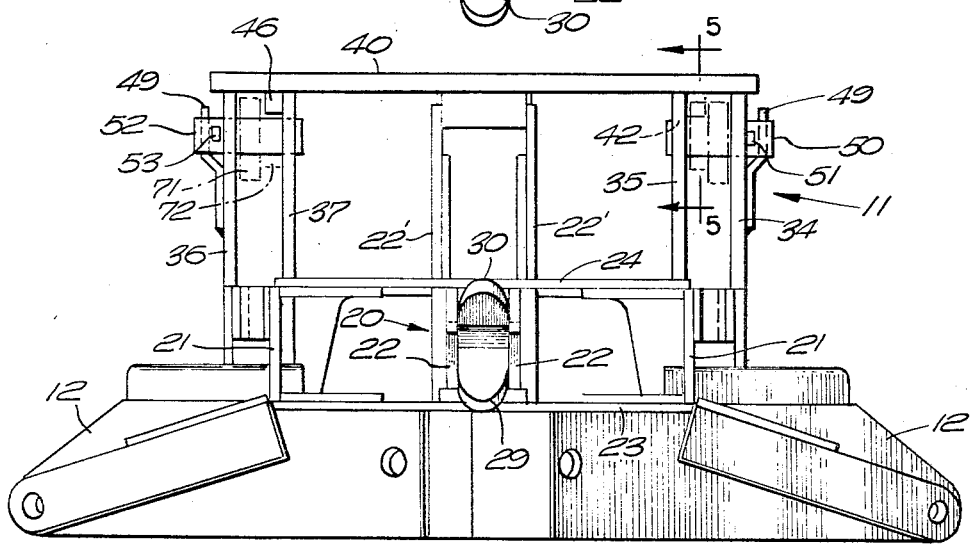
FIG. 4 is a view in side elevation looking from left to right at FIG. 2, with the tractor lugs added in dot-dash.
Figure 5:
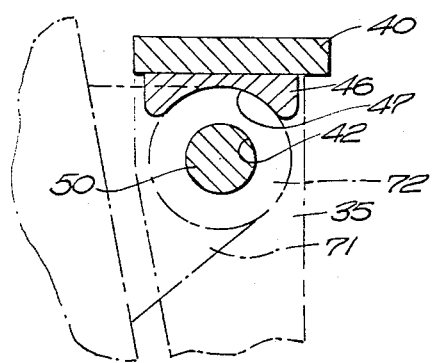
FIG. 5 is an enlarged section taken on the line 5—5 of FIG. 4.

A pair of lugs 71 extend outwardly from the end of the tractor. Each lug is provided with a cylindrical projecting member or boss 72. Coaxial holes or bores 73, 74 extend through these lugs and bosses. The diameters of these bores are sufficient to slidably receive the pins 50 and 52. In FIGS. 4 and 5 end projecting members are shown in dot-dash lines in the positions they assume when the tractor is hitched to the excavating apparatus.

The numeral 80 in FIG. 1 indicates the hydraulic lines or conduits which conduct fluid under pressure to the cylinders for actuating the pistons which actuate the stabilizing legs, boom, dipper stick system and bucket (not shown).

To attach the pneumatically operated excavator apparatus to a tractor the couplings for the hoses on the tractor (not shown) are connected to the couplings for the hoses on the pneumatically operated excavating apparatus (not shown), thereby to energize the pneumatic system 80 of the pneumatically operable excavating apparatus.

Then the excavator apparatus is tilted using the stabilizer legs 14 so that the walls 27, 28 of the grooves 25 are generally horizontal. Then the tractor is moved towards the pneumatically operated apparatus until the tongue 20 is located beneath the adjacent end of the tractor and the central portion of the connecting rod 60 is located in the grooves 25 with its arcuate surface in contact with the arcuate end walls 26 of the grooves. During this operation the arcuate lips 67 of the guide plates 66, the guide plates 29 and 30 and the walls 27, 28 of the grooves function to guide the rod 60 into position in the grooves 25.

With the rod 60 in position in the grooves, the excavating apparatus is levelled by manipulation of the stabilizing legs and this causes the tractor lugs 71 to pass into the spaces between the connecting member plates 34-35 and 36-37. As the ends of the lugs 71 enter these spaces the upper portions of the bosses 72 enter the arcuate portions or grooves 47 of the members 46 which project inwardly from the upper portions of the plates 35, 37 and this aligns the bores 73, 74 with the bores 41, 42, 43, 44.

Because the grooves 25 are located centrally of the pneumatically operated apparatus the longitudinal axes of the connecting member plates 34-35, 36-37 may be tilted in all directions relative to the ground by manipulation of the stabilizer legs thereby facilitating alignment of the tractor lugs 71 with the spaces between the plates 34-35 and 36-37 and subsequent alignment of the bores so the pins 50, 52 may be inserted. Such an operation is difficult and time consuming to perform with the prior art four point hitches.

After the tractor lugs 71 have been properly positioned between the connecting member plates so that their transverse bores are in alignment with the transverse bores 41, 42 and 43, 44 the pins 50, 52 are inserted in the bores and the handles 51, 53 are rotated to positions between the retaining members 49 and the adjacent plates as shown in FIG. 4.

To detach the excavating apparatus from the tractor the pins 50, 52 are rotated by means of handles 51, 53 and removed from the bores. Then by use of the stabilizer legs the pneumatically operated apparatus is tilted so that the walls 27, 28 of the groove 25 are substantially horizontal and this tilting operation causes the connecting member plates 34, 35 and 36, 37 to rotate away from the tractor lugs 71. The tractor is then moved away from the excavating apparatus and the connecting rod 60 moves out of the grooves 25. The hydraulic lines are then uncoupled and the tractor driven away from the excavating apparatus.

From the foregoing description it will be apparent to persons skilled in this art that this invention provides a tractor hitch for a hydraulically operated excavating apparatus which is easy to attach and detach, which overcomes many of the difficulties found in presently known hitches and that the hitch elements are economical to manufacture and do not involve moving parts so that they are easy to maintain, install and operate. It will also be apparent that because the hitch tongue 20 extends beneath the tractor and the tractor lugs 71 project outwardly of the tractor only a short distance, the overall length of the tractor and the excavating apparatus is maintained at a minimum when they are hitched together.

Various changes can be made in the disclosed embodiment without departing from the spirit of this invention,

I claim:

1. A hitch for hydraulically operable excavating apparatus comprising:
   the combination of a rigid hitch tongue extending outwardly centrally of the excavating apparatus,
   at least one groove near the end of said tongue formed by an end wall and spaced downwardly inclined top and bottom walls extending outwardly from said end wall, said groove being adapted to receive a connecting rod mounted beneath a tractor,
   two pairs of rigid connecting members, the first pair being located laterally of one side of said tongue and the second pair being located laterally of the opposite side of said tongue, and
   coaxial transverse bores extending through the walls of each pair of connecting members, the axes of said bores being located rearwardly of the end wall of said groove and at a higher elevation than the top wall of said groove, each pair of connecting members being adapted to receive between them a tractor lug having a transverse bore for registration with said transverse bores of the connecting member walls.

2. A hitch according to claim 1 wherein the end wall of the groove is arcuate.

3. A hitch according to claim 1 wherein the top and bottom walls of the groove are substantially parallel to a plane which extends through the axes of said transverse bores of the connecting members and the center line of the end wall of the groove.

4. A hitch according to claim 1 wherein said tongue also comprises an upwardly inclined guide member extending outwardly from the top wall of the groove.

5. A hitch according to claim 1 wherein said excavating apparatus also comprises a plurality of stabilizer legs for elevating and tilting the excavating apparatus relative to the surface of the ground.

6. A hitch according to claim 1 wherein at least one connecting member of each pair of connecting members comprises a member extending laterally towards the other connecting member of that pair, said laterally extending member having on its lower surface an upwardly arcuate portion adapted to receive the arcuate portion of a laterally projecting member located on a tractor.

7. A tractor and detachable hydraulically operable excavating apparatus comprising:
   a rigid hitch tongue extending outwardly centrally of the excavating apparatus beneath the end of the tractor,
   at least one groove near the end of said tongue formed by an end wall and spaced downwardly inclined top and bottom walls extending outwardly from said end wall,
   a connecting rod mounted beneath a tractor and positioned in said groove,
   two pairs of spaced rigid connecting members on said excavating apparatus, the first pair being located laterally of one side of said tongue and the second pair being located laterally of the opposite side of said tongue,
   coaxial transverse bores extending through the walls of each pair of connecting members,
   a pair of lugs mounted on the tractor and extending into the spaces between said connecting members, each lug having a transverse bore which is substantially coaxial with the bores of the adjacent connecting members,
   pins extending through said bores,
   the axes of said bores being located rearwardly of the end wall of said groove and at a higher elevation than the top wall of said groove,
   whereby the excavating apparatus may be detached by removing said pins, tilting the upper portions of the excavating apparatus away from the tractor and driving the tractor away from the excavating apparatus.

8. Apparatus according to claim 7 wherein the top and bottom walls of the groove are substantially parallel to a plane which extends from the axes of the transverse bores of the connecting members through the center of the end wall of the groove.

9. Apparatus according to claim 7 wherein said excavating apparatus also comprises a plurality of stabilizer legs for elevating and tilting the connecting members relative to the surface of the ground.

10. Apparatus according to claim 7 wherein one connecting member of each pair of connecting members comprises a member extending laterally towards the other connecting member of that pair, said laterally extending member having on its lower surface an upwardly arcuate portion adapted to receive an arcuate portion of a laterally projecting member located on the tractor lug positioned in the space between said connecting member walls.

References Cited

UNITED STATES PATENTS

| | | | |
|---|---|---|---|
| 3,003,651 | 10/1961 | Holopainen | 214—138 |
| 3,034,587 | 5/1962 | Dorkins | 172—274 |
| 3,047,109 | 7/1962 | Holopainen | 287—189.36 |
| 3,275,163 | 9/1966 | Schaeff | 212—145 |

LEO FRIAGLIA, *Primary Examiner.*